T. H. HABERKORN.
BY-PASS AND RELIEF VALVE DEVICE FOR STEAM ENGINES.
APPLICATION FILED OCT. 17, 1910.
1,039,523.  Patented Sept. 24, 1912.
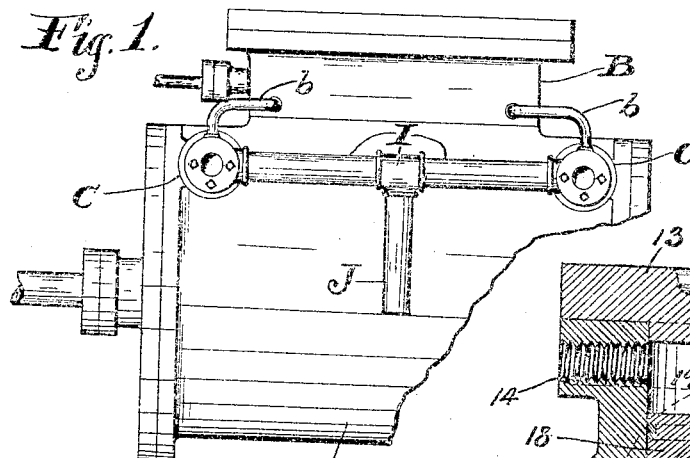
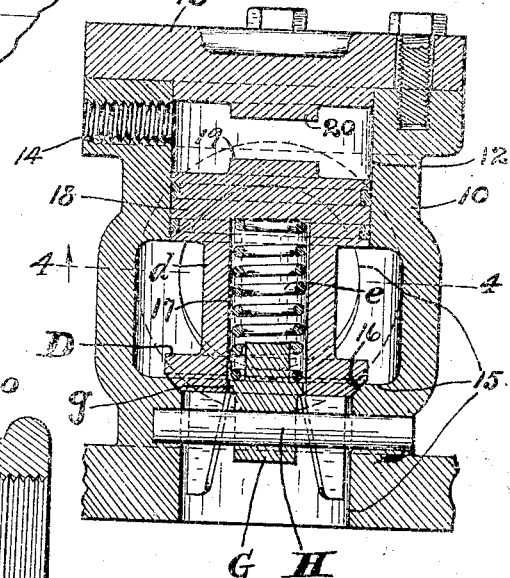
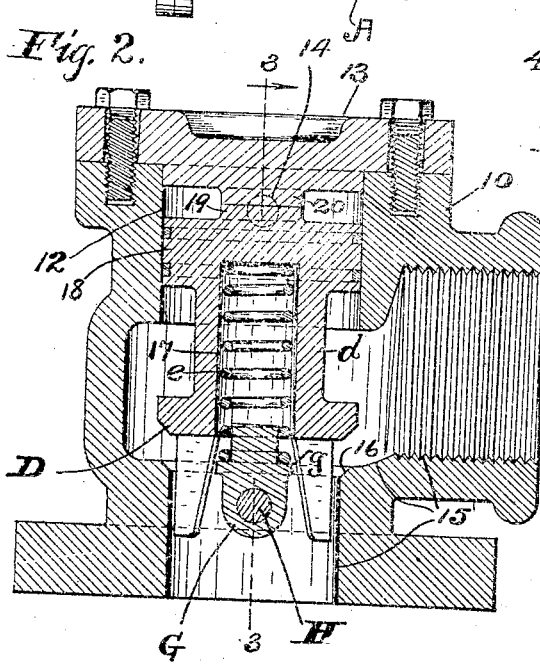
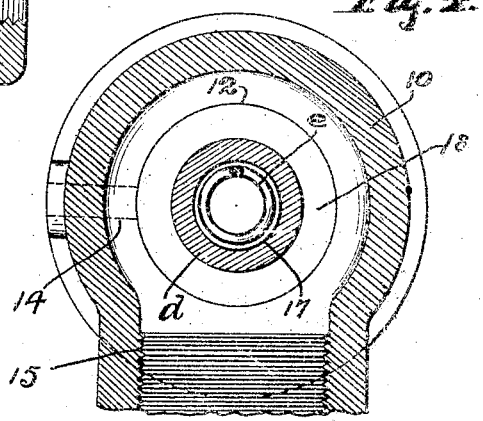
Witnesses:
H. J. Gettins.
B. C. Brown.
Inventor:
Theodore H. Haberkorn
By Jackson
his Attorneys

UNITED STATES PATENT OFFICE.

THEODORE H. HABERKORN, OF FORT WAYNE, INDIANA.

BY-PASS AND RELIEF VALVE DEVICE FOR STEAM-ENGINES.

1,039,523.  Specification of Letters Patent.  Patented Sept. 24, 1912.

Application filed October 17, 1910. Serial No. 587,495.

*To all whom it may concern:*

Be it known that I, THEODORE H. HABERKORN, a citizen of the United States of America, residing at Fort Wayne, in the county of Allen and State of Indiana, have invented certain new and useful Improvements in By-Pass and Relief Valve Devices for Steam-Engines; and I hereby declare the following to be a full, clear, and exact description of the invention, such as will enable others skilled in the art to which it pertains to make and use the same.

This invention relates to improvements in combination by-pass and relief valve-devices more especially adapted for use in connection with the cylinders of steam-engines.

One object of this invention is to provide a by-pass and relief valve-device whereby a cylinder of a steam-engine can be relieved of water which, in the absence of a valve-device of the character indicated, would be trapped in the cylinder and result in great damage such, for instance, as breaking of the cylinder-heads or cylinder and otherwise straining the reciprocating parts of the engine.

Another object is to provide a valve-device of the character indicated whereby the cylinders of steam-engines, more especially on locomotives, can be relieved of the vacuum or suction resulting during the movement of the pistons in the cylinders when the steam is shut off and the engine is running or drifting, and thereby prevent said vacuum or suction, which is produced in one end of a cylinder while compression of air is had in the other end of the cylinder, from creating suction through the exhaust-pipe when the main distributing valve opens the exhaust, and consequently avoid the passage of smoke and cinders into the cylinders from the smoke-box into which the said exhaust-pipe extends.

Another object is to permit the passage of hot air from one end of the cylinder to the other end of the cylinder as the steam is shut off from the steam-chest, and by such passage of air destroy any vacuum created by the moving piston of the cylinder, as in the case of an engine running or drifting with steam shut off, and keep the cylinder-walls hot and thereby prevent condensation when steam is again admitted to the cylinder.

Another object is to provide a by-pass and relief valve-device which is simple in construction, reliable in its operation and not liable to get out of order.

With these objects in view, and to the end of attaining any other advantage hereinafter appearing, this invention consists in certain features of construction, and combinations and arrangement of parts, hereinafter described, pointed out in the claims, and illustrated in the accompanying drawings.

In the said drawings, Figure 1 is a side view of a portion of a steam-cylinder provided with by-pass and relief valve-devices embodying my invention. Fig. 2 is a central section taken through the valve-casing of one of the said by-pass and relief valve-devices. Fig. 3 is a vertical section on line 3—3, Fig. 2, looking in the direction indicated by the arrow, except that in Fig. 3 the valve is shown closed whereas in Fig. 2 the valve is shown open. Fig. 4 is a horizontal section on line 4—4, Fig. 3, looking upwardly.

Referring to Fig. 1 of the drawings, A indicates the cylinder of a steam-engine; B, the steam-chest on the cylinder; C and C, two by-pass and relief valve-devices embodying my invention and attached to opposite ends respectively of the cylinder, and *b* and *b* pipes for conducting live steam from the steam-chest to the said valve-devices.

Each valve-device (see Figs. 2, 3 and 4) comprises a valve-casing 10 which is provided interiorly with a circular chamber 12. The valve-casing 10 is provided with a head 13 at one end of the said chamber, which head forms an end wall of the said chamber and is secured in place in any approved manner, and the said chamber has a steam-inlet at the said end of the chamber, which steam-inlet is formed by a port 14 with which the valve-casing is provided. Said steam-inlet 14 upon the application of the valve-device to the cylinder of a steam-engine is placed in communication in any approved manner with the steam-chest on the cylinder, as, for instance, by a pipe $b$ shown in Fig. 1, so that steam is supplied from the steam-chest when the latter is charged with steam to the said steam-inlet. It will be observed therefore that the chamber 12 in the valve-casing is closed at one end thereof and at the said end has a steam-inlet 14 adapted to be placed in communication with the steam-chest of a steam-engine, and I would here remark that the said valve-casing is also provided interiorly with a passageway 15 which extends through the valve-casing at the opposite end of the said chamber, which passageway has one end portion thereof arranged substantially in line endwise with the said chamber and has its other end portion arranged substantially at a right-angle to and consequently extending laterally of the said chamber. A valve-seat 16 is formed around the inner end of the first-mentioned end portion of the passageway 15 and flares and consequently faces in the direction of the chamber 12, and a normally open valve D is contained interiorly of the valve-casing, which valve in its closed position seats on the said valve-seat. The passageway 15 at the outer end of its end portion which is substantially in line endwise with the chamber 12 is adapted to be placed in communication with the cylinder of a steam-engine at one end of the cylinder, and the valve D in its closed position interrupts communication through the said passageway.

The valve D has a hollow body $d$ which is provided interiorly with a cylindrical bore 17 which extends a suitable distance inwardly from the forward end of the valve, and the said body terminates in a piston 18 arranged within and movable endwise of and fitting the chamber 12. It will be observed therefore that the piston 18 is operatively connected with the valve D. A suitably applied spiral spring $e$, acting to retain the valve D in its open and normal position, is arranged within the bore 17 and confined between the inner end of the said bore and a shoulder or abutment $g$ formed on a block G arranged within the passageway 15 forwardly of the valve and mounted on a pin H which is arranged substantially at a right angle to the line of movement of said valve and pivoting said block or abutment to the valve-casing. The piston 18, in the open position of the valve D, is arranged to be actuated to close the valve, against the action of the spring $e$, by fluid-pressure resulting from the supply of steam to the chamber 12 through the steam-inlet 14 of the chamber, and the valve in its closed position is adapted to be opened by the admission, to the passageway 15 at the outer end of its end portion which is substantially in line endwise with the said chamber, of fluid-pressure greater than the valve-closing fluid-pressure supplied through the said steam-inlet.

By the construction hereinbefore described it will be observed that the spring $e$ is housed within the body $d$ of the valve where it is out of the way and adequately protected.

A stop for limiting the movement of the piston 18 during the actuation of the piston to open the valve D is provided and is preferably formed by a lug 19 on the piston and a lug 20 on the head 13 of the valve-casing. The lug 19 projects forwardly toward and is arranged opposite the lug 20. The stop thus formed by the said lugs prevents the piston, during the actuation of the valve from its closed position into its open position, from moving far enough to cover the steam-inlet 14 of the piston-containing chamber and thereby interrupt the passage of steam through the said steam-inlet. Also the stop thus formed by the said lugs does not interfere with the provision of an adequate space around the said lugs in the open position of the valve, as shown in Fig. 2.

Of course, a steam-cylinder, to which my improved by-pass and relief valve-device is applicable, is equipped with two such valve-devices applied to opposite ends respectively of the cylinder, and the passageways 15 in the valve-casings of the said valve-devices, where the said passageways extend laterally of the piston-containing chambers in the valve-casings, are placed in communication with each other by a suitably applied pipe-line I, shown in Fig. 1, so that the passageway 15 in each valve-casing is continually in communication at a point between the valve-seat and the piston-containing chamber of the valve-casing with the corresponding passageway in the other valve-casing at a point between the piston-containing chamber and the valve-seat of the last-mentioned valve-casing. The pipe-line I is provided intermediate the ends thereof, as shown in Fig. 1, with a branch or outlet J which leads to the external atmosphere.

I would here remark that when a locomotive is drifting there is suction in one end of the cylinder and the hot air in the other end of the cylinder is under pressure, but as the pipe-line I extends substantially in a direct line, as shown in Fig. 1, between the two valve-devices C on the cylinder, delivery of the said hot air under pressure to the first-mentioned end of the cylinder, substantially without drawing in cold air from the branch-pipe J, is insured.

As already hereinbefore indicated, the valve D contained by the valve-casing of my improved valve-device is closed, against the action of the spring $e$, as shown in Fig.

3, by steam-chest pressure on the piston operatively connected with the valve, and the said valve is opened by cylinder-pressure when the cylinder-pressure exceeds the steam-chest pressure as will be the case when water is being compressed in the cylinder by the moving piston in the cylinder, but of course when the steam is shut off from the steam-chest the said valve is retained in its open and normal position by the spring, thereby permitting the passage of hot air from one end of the cylinder to the other end of the cylinder through the pipe-line I which is employed, as already indicated, in connecting together two by-pass and relief valve-devices which are applied to opposite ends respectively of the cylinder, and obviously such passage of hot air results in the destruction of any vacuum created by the moving piston in the cylinder as in the case of an engine running or drifting with steam shut off. It will also be observed that hot air passing from one end of the cylinder enters the other end of the cylinder substantially at the moment steam is shut off from the steam-chest, and the hot air thus passing from one end to the other end of the cylinder keeps the cylinder-walls hot and thereby prevents condensation when steam is again admitted to the cylinder. It is obvious of course that when the cylinder-pressure exceeds the steam-chest pressure, as in case of the injection of water with steam into the cylinder at one end of the cylinder, the valve of my improved valve-device at said end of the cylinder is opened by the cylinder-pressure and the latter forces said water to and through the branch or outlet J of the pipe-line I as the valve of my improved valve-device at the opposite end of the cylinder is held in its closed position by steam-chest pressure.

It will be observed that a steam-engine cylinder equipped with valve-devices embodying my invention is relieved of any water passing with steam into the cylinder and trapping of water in the cylinder is successfully avoided so that no great damage such, for instance, as the breaking of cylinder-heads, or straining of reciprocating parts of the engine, is possible. Also, the application of my improved valve-device to the steam-cylinders on locomotives is advantageous for the reasons hereinbefore stated. Also, the said valve-device is simple in construction, readily applicable, reliable in its operation, and not liable to get out of order, and only one valve at each end of the cylinder for the purposes of relief and by-pass is required. I would also remark that not unimportant is the pivoting, as at H, of the abutment G formed for the outer end of the spring e of each valve-device to the valve-casing, as shown, so as to establish and maintain an effective relation of the spring to the valve of said valve-device. In fact, the application of said spring in the manner shown is materially helpful in preventing said valve from sticking.

What I claim is:—

1. The combination, with two valve-casings spaced to render them capable of application to opposite ends respectively of a steam-engine cylinder, each valve-casing having a chamber which is closed at one end thereof and at said end has a steam-inlet adapted to be placed in communication with the steam-chest on said cylinder, which valve-casing is provided with a passageway which extends through the valve-casing at the opposite end of said chamber, the passageway in one valve-casing being adapted to be placed at one end thereof in communication with said cylinder at one end of the cylinder and the passageway in the other valve-casing being adapted to be placed at one end thereof in communication with said cylinder at the opposite end of the cylinder; a normally open valve in each valve-casing, which valve in its closed position interrupts communication through the passageway in said valve-casing; a piston arranged within and movable endwise of the aforesaid chamber in each valve-casing and operatively connected with the valve in said valve-casing, and a spring within each valve-casing, which spring acts to retain the valve in said valve-casing open, of a pipe-line connecting the two valve-casings together and communicating with the passageway in each valve-casing at the other end of said passageway, said pipe-line being provided intermediate the valve-casings with an outlet which leads to the external atmosphere.

2. In a by-pass and relief valve-device for a steam-engine, a valve-casing provided interiorly with a circular chamber closed at one end thereof and at said end having a steam-inlet; a passageway extending through the valve-casing at the opposite end of said chamber, which passageway has one end-portion thereof arranged substantially in line endwise with said chamber and has its other end-portion extending laterally of said chamber; a valve-seat extending around the inner end of the first-mentioned end-portion of said passageway and facing in the direction of said chamber; a normally open valve which in its closed position seats on said valve-seat and interrupts communication through the said passageway, which valve has a hollow body provided centrally with a bore extending from the forward end of the valve inwardly, which body terminates in a piston arranged within and movable endwise of said chamber; a spiral spring housed within said body and arranged longitudinally of said bore, which spring acts to retain the valve open, and an abutment for the outer end of the
5 spring, which abutment is pivoted to the valve-casing substantially at a right angle to the line of movement of the piston.

In testimony whereof, I sign the foregoing specification, in the presence of two witnesses.

THEODORE H. HABERKORN.

Witnesses:
PAUL F. KUHNE,
H. R. KUHNE.